R. M. BEARD.
SECRET BRANCH OR PRIVATE EXCHANGE SWITCHBOARD.
APPLICATION FILED APR. 15, 1914.
1,185,363.
Patented May 30, 1916.
2 SHEETS—SHEET 2.
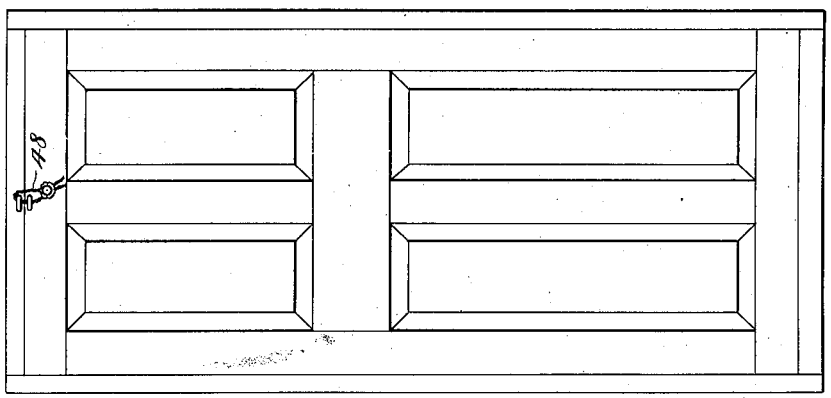
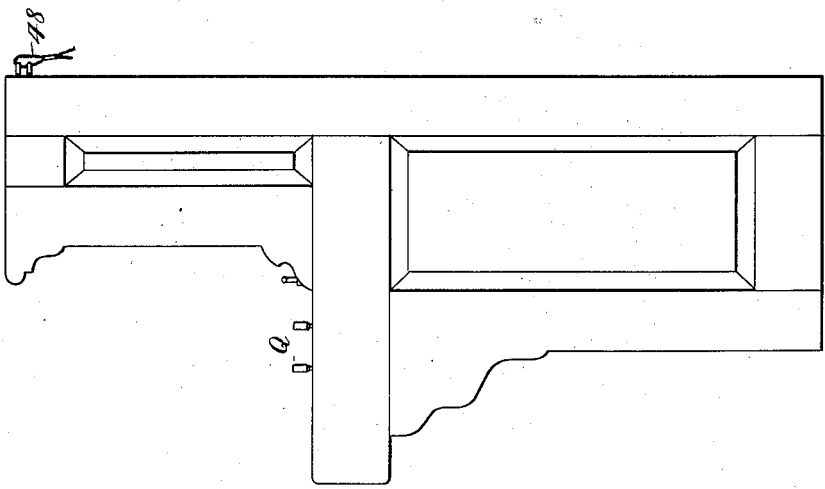
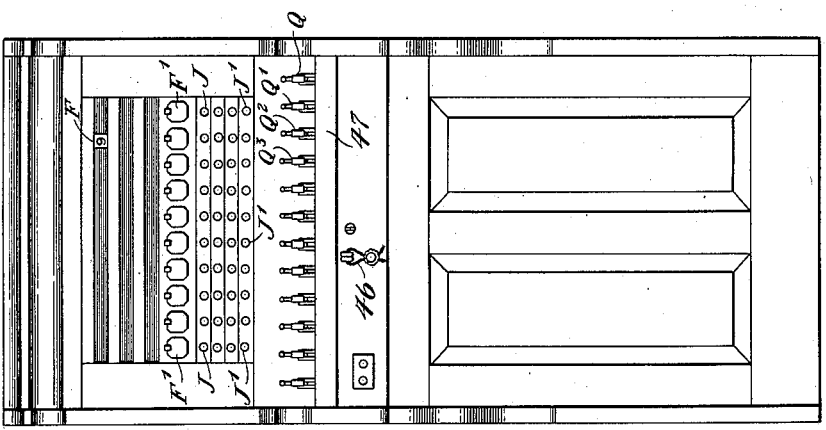
Witnesses:
Inventor
Richard M. Beard
By his Attorneys

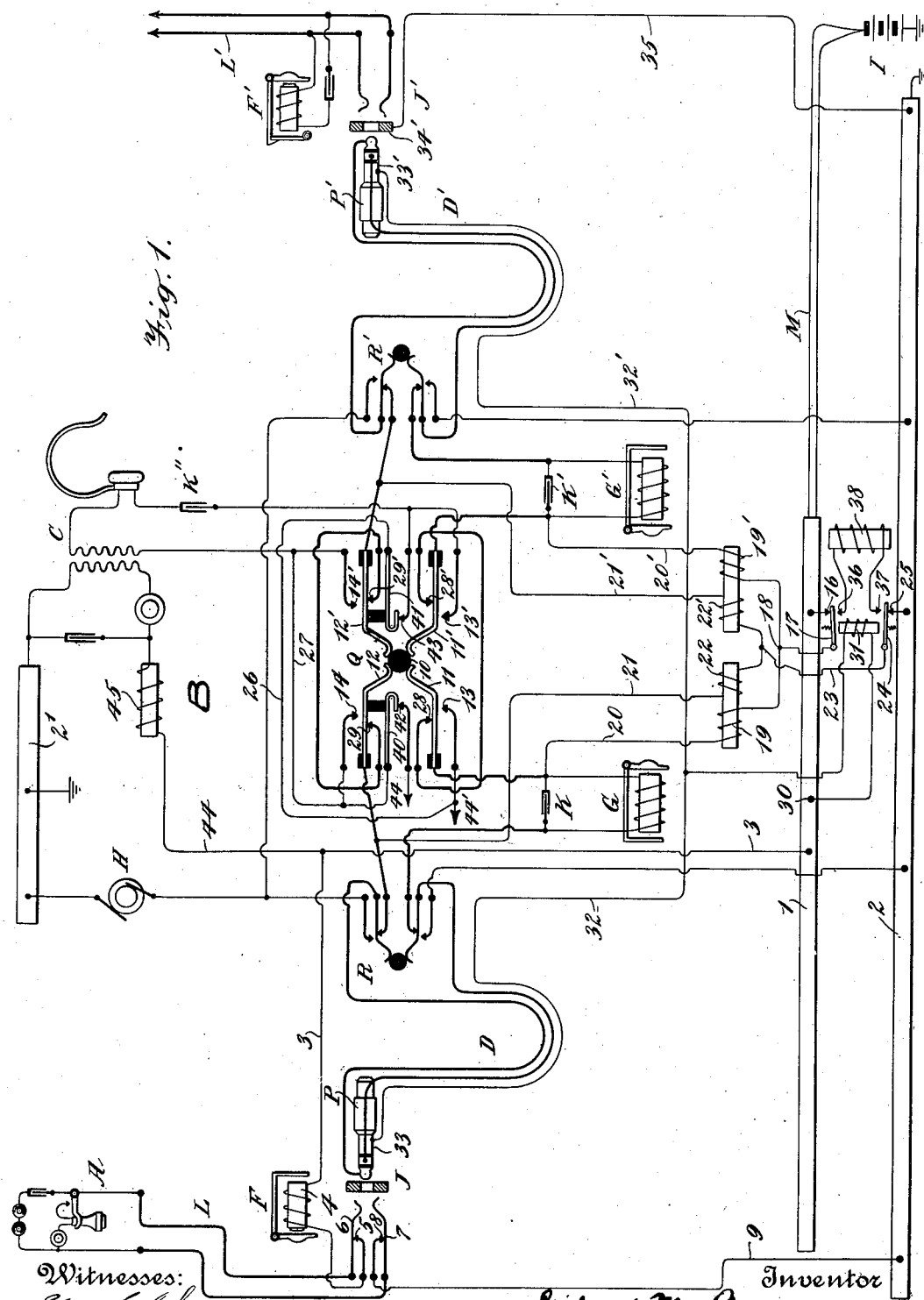

UNITED STATES PATENT OFFICE.

RICHARD M. BEARD, OF NEW YORK, N. Y.

SECRET BRANCH OR PRIVATE EXCHANGE SWITCHBOARD.

1,185,363.　　　　　Specification of Letters Patent.　　Patented May 30, 1916.

Application filed April 15, 1914. Serial No. 831,899.

*To all whom it may concern:*

Be it known that I, RICHARD M. BEARD, a citizen of the United States, residing at the city of New York, in the borough of Manhattan and State of New York, have invented certain new and useful Improvements in Secret Branch or Private Exchange Switchboards, of which the following is a full, clear, and exact description.

My invention relates broadly to a secret telephone exchange system in which all parts which could be disarranged to destroy the secrecy thereof are sealed within a closed cabinet.

It relates more specifically to an installation of this character which is adapted to be used as a branch exchange, *i. e.* an exchange having two or more lines, usually called extensions, to local subscribers, and one or more lines, commonly known as trunks, to a main central exchange.

The principal object of the invention is to provide an installation, the secrecy of which is absolute, the circuits being so arranged that the switchboard attendant or operator cannot listen in simultaneously upon any two lines terminating in the switchboard, neither trunk lines nor extensions, and furthermore the operator is unable to connect any third party for the purpose of allowing eavesdropping upon two other parties.

A further object of the invention is to provide means by which the operator may readily manipulate her listening key to temporarily disconnect one of two connected subscribers, while she is speaking with the other subscriber. This may be done without taking down any of the cord connections, and without interrupting any of the battery circuits or giving an erroneous disconnect signal upon a trunk to the main central exchange.

While the invention is devoted primarily to the purpose of secrecy of communication, and the various conveniences in connection therewith, none of the other desirable features of a modern branch exchange system have been overlooked nor conflicted with in any way.

Other features combined in my invention are as follows:—1. The battery current for the operation of the branch exchange telephones and signals is fed from the main central office. 2. Electro-mechanical visual signals are employed with a view to economy of the battery current. 3. A combination cord circuit, that is, one adapted to be used for both local and trunk connections, is used, in order to secure the greatest speed of operation and avoid the occurrence of errors incidental to the use of a different cord circuit for each purpose. 4. Double supervisory signals, which act properly on both local and trunk connections, are provided in each cord circuit.

The desirability of an instalment combining the last above four advantages with absolute privacy of communication will be readily apparent. More especially will the secrecy feature appeal to the users of branch exchanges in business offices, apartment houses, etc., in large cities.

With these and other objects in view, the invention consists in the construction, combination, in the location and in the arrangement of circuits and parts, as hereinafter set forth and shown, and finally particularly pointed out in the appended claims.

Figure 1 is a diagrammatic view showing a private branch exchange system embodying the principles of my invention; and Figs. 2, 3 and 4 are front, side and rear views respectively of a switchboard cabinet having the invention embodied therein.

Under modern conditions the use of the private branch exchange, as it is commonly called, is constantly increasing. Most business establishments have many departments each equipped with telephones, and it is necessary to have a local exchange to handle the intercommunication between the different departments. This local exchange is also available for putting any department in communication with the city exchange when desired. In this practice the lack of secrecy has always been a very serious disadvantage because the local operator is more or less acquainted with the various local parties, so that if their communications are not secret from this operator, she may obtain a disagreeable familiarity with their business and social affairs. Besides, the quality of the telephonic transmission is often greatly impaired by the local operator having her telephone bridged across the line. This falling off in the volume of the speech due to this cause is especially noticeable in long distance calls. These disadvantages have seriously affected the demand for private or branch switchboards, and have diminished the satisfaction of their otherwise excellent working.

In order that my invention may be more readily understood, I will refer briefly to the ordinary and well known features of a telephone system according to modern American practice.

Under modern conditions the city or central exchange has all the batteries, generators and current producing sources consolidated within itself, and the various signals are made from the subscribers' stations by the mere opening and closing of the subscriber's circuit. The subscriber's line is, therefore, normally under potential conditions, and the change of these potential conditions produces a signal at the central exchange. The subscriber is then connected, through a cord circuit which is plugged into his particular jack, with the operator, and with any other subscriber to whom he desires to talk. The current for this talking circuit is also furnished from a central station battery.

The private or branch exchange operates on exactly the same principle as a city exchange when making local connections, that is, connections between the different local departments. When this is done, the private or branch exchange is entirely separate from the city exchange, and must have its own source of current for the signals, and for the talking circuit. In carrying out my invention I provide for this by special wire connections from the central station (although a local battery could be used if desired). When a branch exchange subscriber is in communication with the city exchange, all the sources of current at the branch exchange are cut off, since the trunk line to the city exchange, which is equipped to furnish all the working currents, is adapted to do so whenever it is connected for communication.

Referring now particularly to Fig. 1 of the drawing, I will first allude to the ordinary features which are common to all branch exchanges, and afterward point out the particular features which pertain to my invention.

A denotes a subscriber's station, having a transmitter and receiver of the ordinary form, and a normally open circuit, which, however, is closed whenever the subscriber takes his receiver off the hook. B indicates the branch or private exchange switchboard circuits, including the operator's telephone set C. D and D' are the calling and answering cords respectively of the exchange, but as my apparatus is exactly symmetrical, it is altogether immaterial which is considered the answering and which the calling cord. J and J' are jacks of which J is on the line of the subscriber A, while J' is a trunk line jack, that is to say, it is the terminal of a line running to the city or central exchange. The line wires of the subscriber A, and of the city exchange are designated L and L' respectively. The above parts constitute the essential elements for completing a talking or communicating circuit between the subscribers, but in addition to these features there are provided the usual signals for indicating when a subscriber wishes a connection, and when he is through with his conversation. There are also provided, as above stated, sources of current at the branch exchange for the calling and for the talking circuits, and which are used under certain circumstances.

F and F' indicate line signals which are designed to operate when the subscriber moves his receiver from the hook, or a signal is received from the city exchange, notifying the branch operator when a connection is desired.

G and G' denote supervisory signals which are provided for each branch of every cord circuit, and indicate the return of a subscriber's receiver to the hook.

H is a source of alternating or pulsating current for the call bells, and R and R' are ringing keys for the respective cords D and D'.

I is a battery at some central station, connected to the branch exchange through conduit wires M.

1 and 2 indicate the local potential terminals, of which 1 is the high potential or ungrounded battery terminal, and 2 is the zero potential or grounded terminal. These features in their broad aspects constitute the ordinary and well known arrangement of an ordinary telephone system, and form no part of my present invention.

My invention consists of a branch exchange installment by which a circuit for the operation of the various signals is preserved regardless of the movements of the branch operator's listening key, but by which the telephonic continuity between any two communicating subscribers is interrupted whenever the operator's key is moved into listening phase with either.

The invention further consists in the combination of circuits for a branch exchange by which the operator cannot connect two cords together into telephonic continuity through the circuit of her instrument.

The invention also consists in the means by which the battery current is fed through retardation coils inductively and therefore telephonically entirely separated from one another to each side of the cord circuit, but in which the connection between the two sides is direct and metallic when a connection is completed between two subscribers.

Additional features relate to the use of a cord circuit, which is adapted to be used either for local or trunk connections, and having supervisory signals which economize the battery current and which secure double supervision.

The particular form of my invention as herein disclosed will be described more in detail in connection with the operation. The operation of a private branch switchboard is not confined to the few simple movements performed by a main central exchange operator, but is much more varied in character. Generally speaking, the operations are of two different classes, namely, those required in establishing trunk connections and those which are essential in handling strictly local calls. In both classes of calls, various movements, not usual in city exchange practice, are performed by the operator to save the time of her employer. I will first describe the operation of my switchboard on local calls.

Let it be assumed that the party at station A wishes to call and talk with another local party. The circuit to station A is normally open at the hook contacts of the telephone, but when the subscriber removes his receiver from the hook, a circuit from the battery is completed through the signal F as follows: from potential terminal 1 at the point 3, through coil 4, of signal F, contact 5, blade 6, of jack J, line wires L, including station A, blade 7, contact 8, and wire 9, back to the ground terminal 2. The movement of the signal F notifies the branch operator that a connection is desired. The operator then places plug P into jack J, which serves to separate the blades 6 and 7 from the contacts 5 and 8, thereby restoring the signal F to its normal position, and moves her listening key Q into position for listening on cord D. The signal F is now wholly cut out of the subscriber's circuit, and a continuous talking circuit substituted through the line L, cord connection D, and listening key Q to the telephone of the operator. In operating her listening key Q, the operator moves the wedge 10 to the left so as to separate the blades 11 and 12. This movement of the blades causes them to break connection with contacts 28 and 29 and presses them against contacts 13 and 14, which are in direct connection with the operator's set. The talking current for station A is obtained as follows: from the potential terminal 1, through contact 16, armature 17, to point 18. From 18 a path is formed through retardation coil 19, and wire 20, directly to the blade 11, which is therefore maintained at high potential. The blade 12 is maintained at low potential, by a similar connection through wire 21, coil 22, wire 23, armature 24, and contact 25, to the ground terminal 2. The blades 11 and 12 are, therefore, maintained at a difference of potential through the retardation coil connections with the battery. These blades 11 and 12 are at this time in connection with the secondary circuit of the operator's telephone set, through wires 26 and 27. The blades 11 and 12 are in direct wire connection with subscriber A, through cord D. This is obtained on account of the fact that the battery current for this circuit finds a path to flow through the supervisory signal G, cord D, line L, and back to the other blade 12. The current is, therefore, flowing continuously through the telephone set of the subscriber, and the varying transmitter resistance makes this current undulating in character, and the pulsations are transmitted partly through the condenser K, which is bridged across the inductive winding of the signal G for this purpose, and through wires 26 and 27, and condenser K'' to the operator's telephone C. The transmitter current for the operator's telephone C is furnished by a special feed wire 44 from the high potential terminal 1, through retardation coil 45, and a connection to the low potential or earth terminal 2', as in common practice. The pulsations produced by the operator's transmitter are induced to the secondary circuit of the operator's telephone, and thereafter over the circuit already traced to station A.

Upon learning from the party at station A that he desires a connection with another local subscriber, the operator plugs cord D' into a jack (not shown) exactly similar to the jack J of subscriber A. Under these circumstances, current flows from point 15 on terminal 1, through retardation coils 19', etc., exactly as it flowed through the coil 19 in the circuit above traced. In the latter circuit it will be noted that current is continuously passing through the signal G, which is, therefore, operated to indicate the fact that subscriber A is still on the line. This signal is, therefore, a proper supervisory signal and remains actuated until the subscriber returns his receiver to the hook, when the signal G returns to normal position and the operator is thereby notified to disconnect. After signaling the called subscriber in the usual manner the operator moves the wedge 10 to central position, and watches the supervisory signal G', which is displayed when the called party removes his receiver from its hook. The two departments are then in communication, because the blades 11 and 12, and 11' and 12' are against their contacts 28 and 29, and 28' and 29' respectively. The current from the battery passes through the coils of the signals G on both sides, while the pulsations due to the voice are partly inductively transmitted through the condensers K and K'. In this communication the central operator can, under no circumstances, listen, because her set is entirely cut out at the points 13, 13', and 14, 14', and any attempt to move her wedge 10 so as to bring her set into circuit, would immediately interrupt the telephonic connection of the two subscribers or departments. The signals G and G' indicate to the operator, however, the condition of the line, and the return to the normal condition of either one of these signals shows her when to disconnect the corresponding subscriber.

In the talking circuit established as above described, my arrangement is such that the retardation coils 19 and 19', and 22 and 22', act respectively in parallel with one another, current flowing through the coils 19 and 19' from the high potential terminal to the blades 11 and 11' (which are metallically connected at this time at the points 28, 28'). This current divides and flows through the lines of the respective subscribers, and through their telephone sets, and returns to the ground terminal through the coils 22, 22', which also act in parallel. In other words, the coils 19, 19', act like a single coil of one-half the impedance of one of these coils, and coils 22 and 22' act likewise upon the talking circuit. The current flowing in this way through the transmitters becomes undulating by the voice vibrations in the usual way, and the undulations are impressed from one subscriber's line into the other, because the reactance of the retardation coils is too great for the rapid undulations of the voice current to become short circuited through them. But while the corresponding retardation coils act thus in parallel when the two subscribers are in communication, they act separately in accordance with my invention when either subscriber is talking to the branch operator. The instant the branch operator moves her wedge 10 in either one direction or the other, the direct metallic circuit between the two subscribers is broken, and, therefore, the subscriber with whom the operator is talking, gets current for his transmitter through only one of the pairs of retardation coils 19, 22, or 19', 22'. This is, however, sufficient for operation. The subscriber who is at this time cut out of telephonic communication, does not, however, receive a disagreeable click in his receiver by such act, because, on account of the particular arrangement of my invention, the battery circuit through his instrument is not broken, but the current continues to flow as before through the appropriate retardation coils. It is, however, of course, impossible for him to get the undulations of the voice currents through the four retardation coils, so that he is absolutely barred from the conversation between the operator and the other subscriber. Thus my apparatus is secret in a double sense. First, it is secret from the branch operator when two subscribers are talking, and second, it is secret from either subscriber when the branch operator is talking to the other one.

I will now suppose that instead of a local call, subscriber A wishes to communicate with a subscriber at another part of the city. The ordinary practice would be for subscriber A to call up the branch exchange operator in the manner already described and direct her to get the connection, and then call him. She would then plug cord D' into a jack J' of any trunk connection L' to the city exchange. The performance of the same cord circuit which has been described in connection with local calls is now totally different, although the movements of the operator are very similar. The establishment of this connection accomplishes three different purposes. It automatically disconnects the potential terminals 1 and 2 of the branch exchange. Secondly, the connection gives the city exchange operator a signal. Thirdly, the connection permits the branch operator to talk to the city exchange operator, i. e., she may do so by moving her listening key into position for listening on the calling cord D'. These functions are secured as follows: The potential terminal 1 has at a point 30, a connection through a coil 31, a wire 32' and sleeve 33' of plug P'. The trunk line jack J' has its sleeve contact 34' grounded through a wire 35. When the plug P' is placed in the jack J', a circuit through the coil 31 is therefore completed, and its energization attracts both of the armatures 17 and 24 away from contacts 16 and 25. This absolutely disconnects the local potential terminals. At the same time the armatures move against new contact points 36 and 37 so that an impedance coil 38 is substituted for the battery previously in circuit. It will be remembered that the battery was previously connected across the talking wires of the cord circuit, but the coil 38 is now substituted in place of the battery for a bridge across the cord wires. The principal purpose is to give a closed circuit on the trunk line to the city exchange regardless of the position of the branch operator's key or whether the subscriber on the extension line has his receiver on or off the hook. Other purposes will later more fully appear. Through this closed circuit the city exchange operator is given a signal that a connection is desired, as in the ordinary telephone practice already pointed out. A signal will be displayed at the city exchange as long as the plug P' is in the jack J', so that whatever the condition of the rest of the cord circuit at the branch exchange, the city exchange operator will not disconnect until the branch operator removes her plug from the trunk jack. In other words, the manipulation to secure the various secrecy features of my invention does not affect in any way the continuation of the holding signal to the city exchange operator. This is because of the location of the operator's listening key with respect to the retardation coils which I employ. The wires of the cord D' are connected to retardation coils 19' and 22', and these are bridged by the holding coil 38, as above described, as long as a plug is in a jack J'. The movements of the key Q have the effect of making and breaking additional shunt connections across the talking wires of the plug P', but no movement of the key Q or the hook of the subscriber A can affect the continuous bridge connection through the coils 19', 38 and 22'. Thus the city exchange operator will not disconnect on account of any actions of subscriber A or the branch operator, until the plug P' is actually removed from the jack of the city or trunk connection.

To talk with the city exchange operator, the branch exchange operator, as before stated, moves her listening key into position for listening on the cord D'. In this position of the listening key Q, in accordance with my invention, the wedge 10 is moved in between the blades 11' and 12', causing them to break contact with contacts 28' and 29' and to make contact with contact points 13' and 14', which are connected to the secondary circuit of the operator's telephone set C. This gives to the said secondary circuit the same potential conditions which exist upon the trunk line L', which is supplied with the requisite battery at the city exchange just as any single line to any subscriber's station. When the city exchange operator speaks upon the trunk line L' the pulsations reach the secondary or receiver circuit of the branch operator's set C. Likewise, when the branch operator makes known the number desired, the vibrations of the transmitter of her set C, which is supplied with battery current from the local potential terminals as already described, are induced into the secondary circuit and thence upon the trunk line L' to the city exchange.

When the branch operator gets into communication with the party desired by the subscriber at station A, she tells him to hold the wire and rings back upon the line L to station A with ringing key R, and then restores her key Q to normal position. The supervisory signal G' is already operated and being held by the battery from the city exchange, and when the subscriber A removes his receiver from the hook the signal G is likewise operated by the battery current from the city exchange, which flows on to station A. Thus station A is supplied with talking current from the city exchange and the line L is given practically the same potential conditions which exist on line L'. The potential conditions of the two lines would be identical but for the shunt through the holding coil 38. The latter, however, owing to the high impedance of the shunt circuit in which it is contained, deflects only a very minute per cent. of either varying or steady currents. With the wedge 10 in central position, the connection between the two lines L and L' is direct and metallic through the direct wire connection between contacts 28 and 28', and 29 and 29', respectively. The retardation coils 19 and 19', and 22 and 22', act respectively in parallel with each other as when supplying battery currents upon a connection between two local subscribers. There is the difference, however, that the battery has been substituted by the coil 38, the impedance of which when added to that of the coils 19 and 19', in parallel with each other, and coils 22 and 22' in parallel, produces a shunt of high impedance. Should the local operator have occasion to interrupt the direct metallic talking circuit between the two subscribers, the flow of the battery current would not be interrupted, and, regardless of the direction of the movement of the said key, no disconnect signal would be given at the city exchange.

To illustrate the value of the last feature of my invention, I will now assume the case of an incoming trunk call. Let it be assumed that, instead of a local party calling for an outgoing connection, a city subscriber calls for a local party. An alternating signaling current from the city exchange would operate the magneto-drop signal F', thus notifying the branch operator in the usual manner. After restoring the drop F', the branch operator would answer by plugging a cord D' into jack J' and listening thereon as heretofore. After learning the identity of the city subscriber, and the local department with which he desires communication, the branch operator may call and talk with the local department on the cord D of the same pair before giving the calling party the desired connection. Under these circumstances, let us assume the exact condition of the connections. Assume that the plug P' is in the trunk jack J' connecting the cord D' with the city subscriber through the city exchange, and that the operator's key Q is in position for listening on the other cord D, which is plugged into the jack J thus connecting the party at station A with the local operator. Assume that the operator is ringing upon the line L, and that the party at station A has not yet removed his receiver to answer. Line L is open to the flow of battery current from the central exchange, but the holding coil 38 is across the line holding the signals at the city exchange in proper relation to indicate a busy line. Now assume that the subscriber at station A answers, automatically closing the circuit at the receiver hook as usual. The battery current from the city exchange now flows on through retardation coils 19 and 22 to station A. The subscriber speaks in answer to the operator, and the undulations produced by his transmitter reach the receiver of the operator just as when the battery supply is from the local potential terminals. Likewise the voice vibrations set up in the local battery circuit of the operator are transmitted to station A as before. But the conversation beween the operator and the party at station A cannot possibly reach the city subscriber, owing to the retarding effect of the various coils 19, 19', 22, 22' and 38, which are in the path of the circuit toward the city exchange, and at a point beyond the point of connection between line L and the circuit of the local operator. Thus the operator may speak to the local subscriber, and receive brief instruction of a strictly private nature, concerning the business of the city party, while the latter is "holding the wire." Such confidential inquiry concerning a party calling from the outside, as for example brief inquiry into his credit standing, is frequently indulged in by the users of private branch exchanges. But, in the usual practice, the changing of cords is necessary to accomplish this purpose, thus greatly increasing the chances for error and confusion, while in this, my invention, it may be done with facility, and the simplicity of the movements of the operator almost completely precludes error. If the operator is instructed by the party at station A to make further inquiry of the city subscriber prior to giving the latter any information, she may do so simply by the movement of wedge 10 from left to right. The operator may speak upon first one cord and then the other of a pair with great speed and facility, and the movements of the listening key Q will in no case have any effect in interrupting the flow of the battery current, or interfering with the signals.

I will now consider briefly the characteristics of the various impedance coils which I have found most effective in the cord circuit shown. The inductance of the coils 19, 22 and 19', 22', must be high, as compared with the retardation coils of ordinary common battery cord circuits, owing to the fact that the conduit wires M introduce considerable resistance between the city exchange battery terminals and the point of connection with the various cord circuits at the branch exchange. More especially is a high inductance necessary because two coils act in parallel with each other as shown. The resistance need not be any higher than is necessary to get the required inductance to prevent cross talk between different cord sets on local connections. When this is done the impedance coils 19 and 19', and 22 and 22', in series respectively with each other in each side of the line on trunk connections, will be found to have sufficient inductance to prevent the conversation getting through them. An additional preventive, to the passage of voice currents from one cord to the other, on a trunk connection with the listening key in one of its operative phases, is the coil 38. This coil, which is of low inductance, offers a practical short circuit to any voice currents which might get through to the point where it is bridged across the circuit. In some instances I have used a non-inductive resistance in the place of coil 38, since the inductance of the bridge is usually high enough owing to the coils 19 19' and 22, 22', even though the latter are in parallel in pairs. It is merely a question, as a rule, of getting the resistance of coil 38 sufficiently high to prevent cutting down too much the potential of a through trunk connection.

Referring generally to the circuit characteristics of the cord circuit, it will be seen that, on both local and trunk connections, there is a direct metallic circuit between the cords for both steady and telephonic currents, when the listening key is in normal position, but when the listening key is in either operative phase, a metallic circuit between the cords is still afforded, which allows steady currents to flow but which is non-transmitting to telephonic currents.

In regard to the operation of the supervisory signals on trunk connections, it will be observed that the signal G returns to its normal relation when the subscriber A returns his receiver to the hook and breaks his line circuit, but the signal G' continues to be displayed as long as the plug P' remains in the trunk jack. This is as it should be, and is secured by the coil 38, which furnishes a path through the signal G', but not through the signal G.

I have referred to a feature of my invention by which it is impossible for the branch operator to connect two separate cord circuits together through the circuit of her instrument. If means were not provided for preventing this, the operator could use two cords of different pairs for making a connection and then connect them through the circuit of her receiver and listen to the conversation. The general plan by which I prevent this manipulation has been already presented in my Patent No. 767,033, and I will, therefore, only refer briefly to the means for its accomplishment in this case. The key Q may be considered the first of a series of keys, Q, Q', Q², Q³, etc., side by side in the usual way (see Fig. 2). Each key has blades 40 and 41 which are connected, as shown to break contacts 42 or 43, when the wedge 10 is moved in one direction or the other. The operator's telephone set is permanently connected to the blades of the key Q as shown, but the connections to the next key Q' of the series are made at the arrow points, 44 and 44', and it will be seen that if the wedge 10 is moved in either one direction or the other, the talking circuit to the next key is broken. If the wedge 10 is moved to the left, it is broken at the point 42. If the wedge 10 is moved to the right, it is broken at the point 43. Therefore, a talking circuit cannot be completed to any succeeding key in the series while key Q is in either of its listening positions. In like manner the actuation of the second key operates to cut out all later keys. Also the third key operates to cut out all keys later than the third. If the third key is first moved into listening phase, and the first key subsequently moved, the third is, of course, immediately cut out by the first. Therefore, only one key on the keyboard can be in listening phase at a time. These features here briefly outlined are not a part of the present invention, except in their application to a branch exchange switchboard, and the patent mentioned is referred to for a more detailed description.

The various details of my invention may be modified in practice. If, however, the signals G have appreciable inductance, it is better to use either the condensers or non-inductive resistances. The important consideration is to have a circuit which will transmit battery current and telephonic currents. I shall, therefore, term this circuit a metallic telephonic connection, it being metallic in the particular structure shown by the connections through the signals G, and also telephonic by assistance, if necessary, of the condensers K. Lamp or other signals could be used instead of the magnetic signals F, F' and G, G'. I prefer, however, to use the magnetic visual signals shown, since they are more economical of current, and this is an important item where it is furnished by conduit wires from a remote point.

An additional feature of my invention which I have briefly touched upon relates to the absolute interchangeability of the two cords whether for local or trunk calls. In order to make this perfectly complete, the sleeve 33 of the plug P is connected by a wire 32 with the coil 31 in exactly the same way as the sleeve connection 33' of plug P' already described. Both such connections are idle and of no effect when the plugs are in extension lines to any local departments, but become effective to cut out the local potential source whenever either plug is connected to the central or city exchange.

In Figs. 2, 3 and 4, the general characteristics of the switchboard cabinet are shown. Thirty extension line jacks J are shown, and one row of trunk line jacks J' which lead to the central or city exchange. The drops corresponding to the trunk connections are conveniently disposed in a row F' and the visual signals F of the various extension lines are arranged in rows corresponding to the location of the jacks J. All of the connections and parts of the keyboard which might be tampered with to destroy secrecy are within the cabinet and a seal 46 is provided to preclude any raising of the lid 47. This makes it impossible to destroy secrecy by any tampering with the keyboard connections, and another seal 48 on the rear of the cabinet prevents any unauthorized access to the switchboard connections proper. So there is no way for an unauthorized person to get at any connection of the board, and there is no way to listen in to a conversation between subscribers without changing such connections.

I claim:—

1. In a branch or private exchange switchboard, a cord circuit having two branches each having talking wires normally connected to a source of potential difference, means for breaking said connection when any cord is plugged into communication with the central or city exchange, and means for telephonically interrupting the cord circuit without destroying the direct current continuity between either branch thereof and the central exchange.

2. In a telephone exchange system, a cord circuit having plugs each connected by two separate circuits, one of which is direct and transparent to battery and talking currents, and the other of which is highly inductive and opaque to talking currents, and means for interrupting said first mentioned circuit.

3. In a telephone exchange switchboard, a cord circuit having similar branches each having a pair of talking wires, blades connected to said talking wires, means for normally connecting said blades together for transmitting battery and talking currents, a wedge for breaking such connection and simultaneously establishing a talking circuit with the operator's set, inductances inductively separated from each other and for maintaining an electrical connection between the talking wires of the respective branches regardless of the movement of said wedge.

4. In a branch or private exchange switchboard, a cord circuit having similar branches each having a pair of talking wires, blades connected to said talking wires, means for normally connecting said blades, a wedge for breaking such connection and simultaneously establishing a talking circuit with the operator's set, and means for bridging the talking wires of both branches through an impedance shunt whenever either branch is plugged into a trunk connection.

5. In a telephone exchange system, a cord circuit having two branches, local potential terminals, retardation coils having an inductive action and connected between said terminals and each branch of said cord circuit, means for connecting the two branches of the cord circuit into metallic telephonic continuity, and means for interrupting such connection between the respective branches, whereby its telephonic continuity is broken without disturbing the potential distribution therein.

6. In a branch or private exchange switchboard, a cord circuit having two branches with talking wires, a source of local potential for maintaining said talking wires at a difference of potential, a special circuit for disconnecting said local source of potential when a trunk connection is made, means for interrupting the telephonic continuity between the two said branches, and means for maintaining the talking wires of the cord circuit at proper potential differences under all conditions regardless of interruptions in the telephonic continuity.

7. In a private or branch exchange telephone system, a talking circuit including a subscriber's set normally connected to a source of local potential for maintaining said talking wires at a different potential, a cord circuit, and a trunk connection with the central or city exchange, means for disconnecting said talking circuit from said local source and connecting it to the central exchange after the trunk connection is made, means for interrupting said cord circuit and simultaneously bridging the operator's set across the talking wires, and a highly inductive separate path or connection around said point of interruption.

8. In a telephone exchange system, a cord circuit having talking wires normally connected to potential terminals, means whereby two subscribers may be put into communication by direct metallic telephonic connections through said cord circuit, and means for interrupting said cord circuit, said interrupting means operating without breaking the battery current connection to the respective subscribers.

9. In a telephone exchange system, a cord circuit having normally direct wire connections for the talking circuit, means for interrupting said talking circuit and dividing it into separate branches and simultaneously bridging the operator's set on one or the other branch, and retardation coils connected to the respective branches, the separate branches being supplied with current through said retardation coils.

10. In a telephone exchange system, a cord circuit having normally direct wire connections for the talking circuit, means for telephonically interrupting and dividing the cord circuit into two branches, separate retardation coils for the respective branches, a local potential source and a holding coil, and means for disconnecting the potential source and substituting the holding coil when either branch of the cord circuit is plugged into a trunk connection.

11. In a branch or private exchange switch-board, a cord circuit having two branches, a local battery source connected to supply current through separate feeds to said two branches, a supervisory signal included in the separate feeds for the two branches, means for disconnecting said source of local potential when a connection is made to the central or city exchange, and means whereby the supervisory signals continue to act independently for the separate branches of the cord circuit when so connected to the central or city exchange.

12. In a branch or private exchange switchboard, a cord circuit having a pair of identical branches with a supervisory signal in each branch, inductively separated retardation coils connected to the respective branches, a battery for supplying current to the separate branches through said retardation coils, an impedance, and means for substituting said impedance for said battery when a central exchange connection is made.

13. In a private or branch exchange telephone system, a telephone circuit including the telephone sets of a subscriber and the branch operator, retardation coils bridged across the talking wires of such circuit and including local potential terminals and means for substituting for said local potential terminals a connection including central exchange terminals, without telephonically connecting the central station into said talking circuit.

14. In a private or branch exchange telephone system, a cord circuit having two branches each having a pair of talking wires, means for normally connecting the talking wires of the respective branches, a local source of potential, retardation coils for connecting said potential source to the talking wires, means for disconnecting said potential source, and means for interrupting the connection between the two branches of the cord circuit, and means whereby current flows from the central station through the various retardation coils to the remote branch of the cord circuit when the latter is so interrupted.

15. In a branch or private exchange switchboard, a cord circuit including an operator's key whereby the talking circuit is telephonically interrupted, and a pair of wires through which current may flow from the main or city exchange to a subscriber when the talking circuit between the subscriber and the city exchange is so interrupted, said wires having retardation coils therein, and being bridged across an impedance shunt.

16. In a branch or private exchange switchboard, a cord circuit, an operator's key arranged to telephonically interrupt the talking circuit thereof between any subscriber and the city exchange, and a pair of wires through which current may flow from the city exchange to said subscriber, said wires each having a pair of retardation coils in series with one another, and a metallic shunt between the wires at points between such retardation coils, whereby the subscriber receives current for his talking circuit from the central exchange, but is telephonically cut off therefrom when the operator's key is actuated.

17. In a telephone exchange switchboard, a cord circuit having two branches each having talking wires normally connected to a source of potential difference, means for breaking said connection when any cord is plugged into communication with another exchange, and means for telephonically interrupting a cord circuit without destroying the direct current continuity between the branches thereof.

In witness whereof, I subscribe my signature, in the presence of two witnesses.

RICHARD M. BEARD.

Witnesses:
WALDO M. CHAPIN,
JOSEPH BUCKLEY.